Dec. 20, 1955  C. H. PHILLIPS  2,727,779
CLAMPS WITH PRESET FLEXIBLE GRAB ARMS
Filed Dec. 29, 1952  3 Sheets-Sheet 1

Inventor:
Clifton H. Phillips
By: Oswald H. Milmore
His Attorney

Dec. 20, 1955  C. H. PHILLIPS  2,727,779
CLAMPS WITH PRESET FLEXIBLE GRAB ARMS
Filed Dec. 29, 1952  3 Sheets-Sheet 2
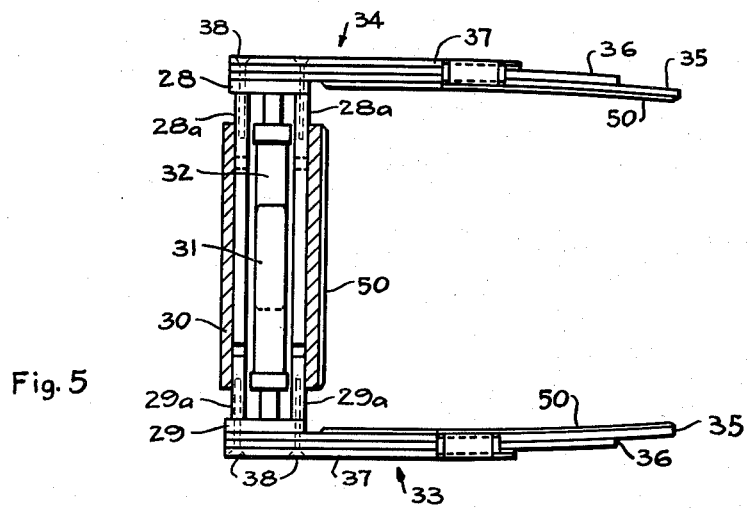
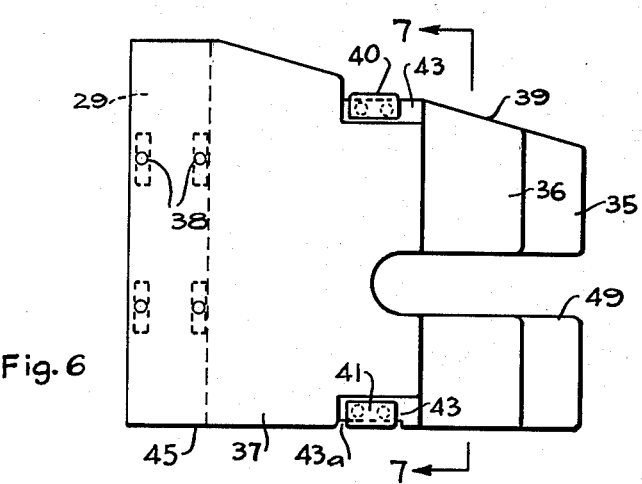
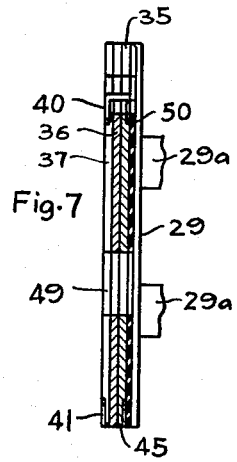
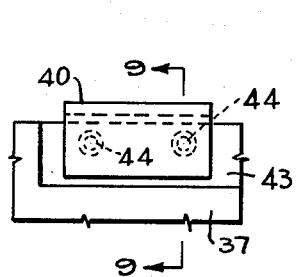
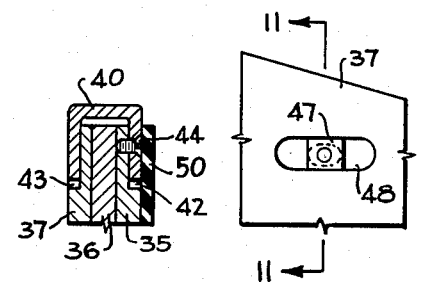
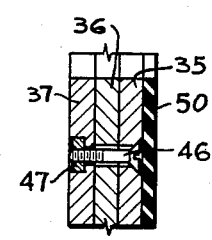
Inventor:
Clifton H. Phillips
By: Oswald H. Milmore
His Attorney Dec. 20, 1955  C. H. PHILLIPS  2,727,779
CLAMPS WITH PRESET FLEXIBLE GRAB ARMS
Filed Dec. 29, 1952  3 Sheets-Sheet 3

Inventor:
Clifton H. Phillips
By: Oswald H. Wilmore
His Attorney

United States Patent Office 2,727,779
Patented Dec. 20, 1955

2,727,779

CLAMPS WITH PRESET FLEXIBLE GRAB ARMS

Clifton H. Phillips, Demarest, N. J., assignor to Shell Development Company, Emeryville, Calif., a corporation of Delaware Application December 29, 1952, Serial No. 328,302

7 Claims. (Cl. 294—99)

This invention relates to clamps having a pair of grab arms that extend forwardly in spaced relation from a pair of supporting, relatively shiftable clamp brackets such as are used, for example, in industrial lift trucks having side-shifting clamps. More particularly, the invention relates to clamps having pre-set arms adapted both for engaging the flat faces of flat-ended objects and for engaging the convex faces of convexly curved objects, specifically cylindrical drums or kegs that may or may not have rolling hoops.

For convenience the invention will be described with reference to specific embodiments applied to an industrial lift truck having side-shifting clamp brackets and grab arms that extend horizontally forwards from the clamp brackets and have substantially vertical, opposed article-engaging faces. The choice of such an embodiment is, however, arbitrary and it should be understood that the improved grab arms and clamp may be used in other positions or inclinations and need not be used on industrial trucks with side-shifting clamps. It is, therefore, evident that such expressions as "horizontal" and "vertical" are used in the description and claims to indicate relative dispositions of parts of the clamp as shown on the appended drawing and are not restrictive of the directions of the parts of the clamp in actual use.

It is often desired to employ the same clamp for handling flat-ended objects, such as boxes and cartons, and convexly curved objects, such as cylindrical drums or kegs. This dual use is not feasible with the usual grab arms: on the one hand, when they have essentially parallel article-engaging faces suited for flat-ended objects they are not well suited for clamping the convex parts of drums because of the danger of forward slippage of the drums, e. g., due to forward inertia of the drum when the clamp is suddenly accelerated rearwardly (as when a forwardly moving lift truck on which the clamp is mounted is stopped suddenly) and due to the spreading of the front parts of the arms in relation to the rear parts incident to deflection caused by the clamping action. This further makes it impracticable to clamp more than one drum with the flat, parallel-sided clamps now used. On the other hand, when the article-engaging faces of rigid or relatively unflexible arms are shaped concavely to conform to the contour of the drum or the like or have inwardly directed projections at their front ends to retain drums, they are not well suited to clamping objects having other shapes, particularly flat-ended objects, because the pressure is not applied evenly to the ends of such objects; this is highly objectionable in the case of fragile containers, such as cartons. Such concavely shaped grab arms, moreover, permit the drums to be picked up in only one predetermined position relative to the clamp (e. g., always upright or always on the side) and result in a construction of the arms that is thick, thereby restricting the use of the clamp to places where there is ample clearance between the object to be clamped and a nearby wall or other objects.

Outward deflection or spreading of the front parts of the grab arms in relation to the rear parts necessarily occurs when the arms are subjected to cantilever loading due to the clamping engagement with objects. This presents difficulties in the design of grab arms that will exert a suitably distributed, more or less uniform or even pressure against the faces of flat-sided objects at different distances out from the supporting clamp brackets, particularly when the clamp is to handle articles with end faces of different sizes and, further, articles of different weights and strengths that require different clamping pressures. Clamps of prior constructions have not been well adapted for clamping simultaneously a plurality of separate articles situated at different points along the length of the arms. The prevailing tendency has been to construct heavy arms that are highly rigid and often have girder-like structures to minimize the outward deflection; such arms are sometimes associated with cushioning facings and/or article-engaging rocker arms to distribute the clamping force. Such heavy arms, however, are inherently thick in the direction perpendicular to the engaging face, making it impossible to insert the grab arm into such close places as the narrow clearances between boxes, drums or kegs, on the one hand, and the wall of a building, van or railroad car or other nearby boxes or drums, on the other. Highly rigid grab arms are, moreover, not well suited for handling fragile objects, such as cartons, unless the clamp-actuating motor is designed to apply only a limited force and is therefore adapted exclusively for clamping light loads, because of the danger of applying too much pressure unless the operator stops the closing of the clamp brackets rapidly at just the proper moment. Difficulty has heretofore been encountered in reconciling such diverse requirement as strength and stiffness adequate to clamp heavy loads and flexibility to avoid damage to fragile loads.

It is, therefore, an object of this invention to provide an improved grab arm for clamps wherein the arm is highly flexible and adapted both for clamping flat-ended objects and for clamping convexly curved objects without the danger of loss thereof by forward slippage. Ancillary thereto, it is an object to provide an improved grab arm that, in addition to being adapted to engage flat-ended objects, can engage and simultaneously support a plurality of flat-ended objects or a plurality of convexly shaped objects with the rounded outlines thereof in engagement with the grab arms, e. g., two boxes or two drums arranged along the length of the clamp, so that each drum is engaged by both arms but at different distances from the clamp slides or brackets, or arranged across the clamp, so that each of the boxes or drums is in engagement with only one arm, or four or more boxes or drums arranged in two rows parallel to the arms, e. g., tesselated, i. e., arranged with the central axes at the corners of a square.

A further object is to provide an improved grab arm for clamps wherein the arm is of flexible construction, is sufficiently thin to enter close places, and is adapted to clamp relatively light or weak objects securely with a light force and without damage thereto as well as to clamp heavier objects securely with a relatively greater force.

A specific object is to provide a clamp having flexible grab arms that are made of leaf spring laminations preset to converge at least at the front or outer ends of the arms, the front parts of the arms having greater lateral flexibilities than the rear or supported parts and said convergence at least as great as the convergence, if any, of the rear parts, the convergence of the front parts being small enough to permit the grab arm to be introduced into close clearances.

In summary, according to the instant invention the grab arm is made of resilient, leaf spring material, the front part thereof is made more flexible laterally than the rear part, and the arms of the clamp are pre-set so that at least the front parts thereof, having the greatest lateral flexibility, are convergent; the rear parts may be parallel or bear some other relation, but preferably they are substantially parallel or only slightly convergent, to an extent not in excess of the convergence of the front parts.

Increased lateral flexibility of the front parts is attained by constructing the arms to have the moment of inertia of the cross sectional area of the arm about a vertical axis smaller at the front than at the rear, e. g., tapering the leaf spring in thickness or height, or by shortening some of the leaves so that only a part of the plurality of leaves extends to the front, or by a combination of these expedients. "Flexibility" is used herein to denote the extent to which the arm can be bent elastically by a given bending moment and is inversely proportional to the moment of inertia of the section about a vertical axis. According to this invention, wherein a multiple-leaf construction is used and wherein the several leaves are arranged as a transverse stack and are free to slip longitudinally relatively to one another so as to increase overall lateral flexibility, the moment of inertia at any section is the sum of the moments of inertia of the several laminations taken about vertical axes situated at the respective neutral planes of the laminations. Reduction in thickness is far more effective than reduction in height insofar as the desired lateral flexibility is concerned, and gradation of the lengths of the leaves is usually preferred to both. When leaves of different lengths are used the inner leaf (which faces the opposite grab arm) is preferably made longest so as to present on each arm a continuous article-engaging surface without steps, the outer laminations being made progressively shorter. Any number of leaves may be used; for simplicity, three are used in the illustrative embodiments to be described.

The invention will be described in detail by reference to the accompanying drawing forming a part of this specification and showing certain preferred embodiments of the invention by way of illustration, wherein:

Figure 5 is a detailed plan view of the clamp, part of the stationary supporting guide bracket being broken away;

Figure 6 is a side elevation view of the grab arm;

Figure 7 is a vertical section taken on line 7—7 of Figure 6;

Figure 8 is an enlarged fragmentary elevation view showing a clip used to retain the spring leaves of the grab arms;

Figure 9 is a vertical section view taken on line 9—9 of Figure 8;

Figure 10 is a fragmentary side elevation of a modified grab arm having an alternate device for retaining the spring leaves;

Figure 11 is a vertical section taken on line 11—11 of Figure 10;

Figure 1:
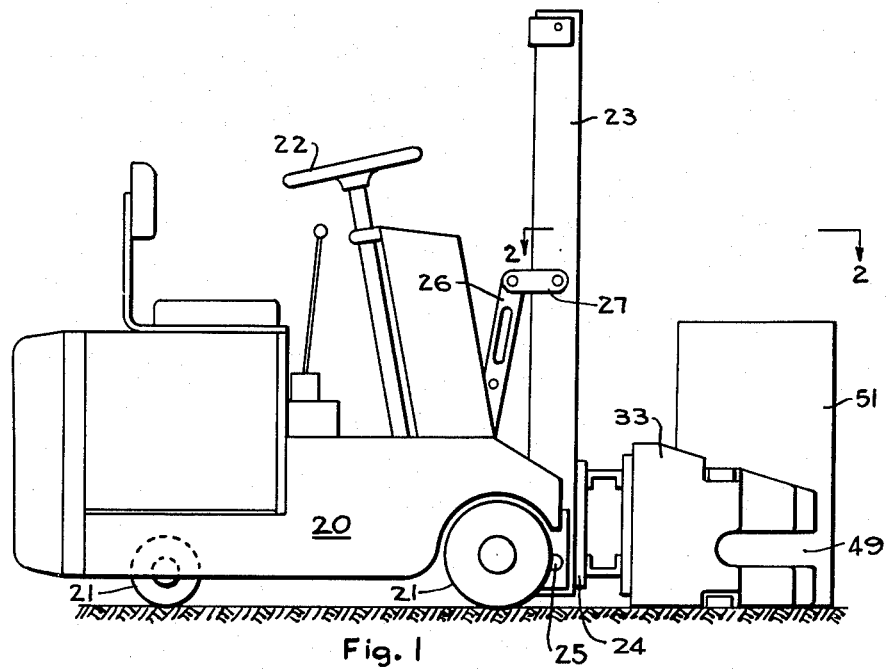
Figure 1 is a side elevation view of an industrial lift truck with a side-shifting clamp having a grab arm according to the invention used on a box with parallel, flat ends.
Figures 2, 4:
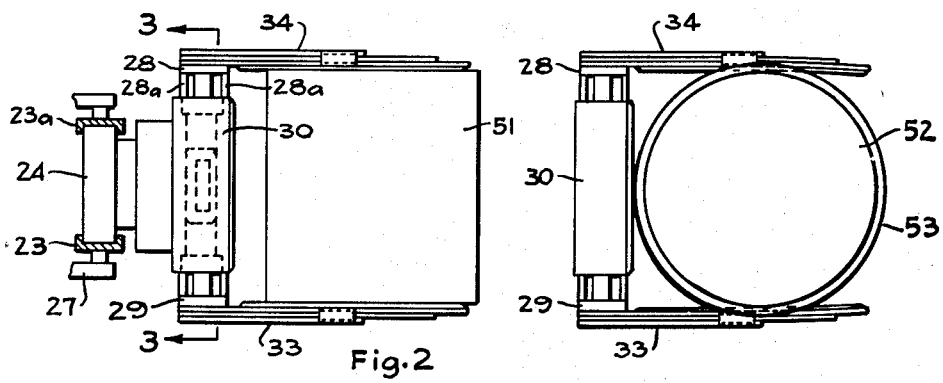
Figure 2 is a horizontal section taken on line 2—2 of Figure 1.
Figure 4 is a fragmentary plan view of the clamp corresponding to a part of Figure 2, showing the same clamp used on a single upright cylindrical drum having rolling hoops.

Referring to Figures 1–9 of the drawings in detail, the clamp is illustrated as applied to a conventional industrial truck 20 having wheels 21, a steering wheel 22 and the usual accessories, including (not shown) a hydraulic reservoir, pump and controls for actuating the elevator, tilting controller, clamps, etc. The truck carries vertical guide columns 23 and 23a which provide vertical tracks for an elevator 24 which is vertically movable in the trackways. The guide columns may be mounted for pivoted motion about a transverse pin 25 that is fixed to the truck chassis, tilting being effected by actuation of tilting levers 26 that are connected to the guide columns by pivoted links 27. The elevator 24 and levers 26 are actuated by suitable motors controlled from the truck, such as hydraulic motors; such motors and controls and the elevator being all well known in the art, they are not further described herein.

Figure 3:
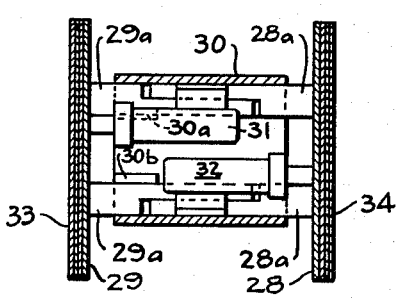
Figure 3 is a vertical section view taken on line 3—3 of Figure 2.

Two laterally movable, telescoping clamp slides or clamp brackets 28 and 29 are slidably mounted on the elevator by means of a stationary hollow support bracket 30 that is fixed to the latter. Each clamp bracket has four rectangular slide bars indicated at 28a and 29a, situated one at each interior corner of the bracket 30 for sliding engagement therewith along laterally extended parts thereof to resist relative rotation about a vertical axis such as would be induced by the spreading tendency of the grab arms to be described, when an article is clamped. The ends of the slide bars may be rabbeted as shown in Figure 3 to increase their lengths, and the bars 29a may be given added vertical support by stationary bars 30a and 30b on the support bracket. The clamp brackets and slide bars are able to transmit to the support bracket cantilever stress about a horizontal, transverse axis, such as would result from the weight of the objects clamped. The clamp brackets are provided with a suitable clamp-actuating motor of any desired type, such as a pair of double-acting hydraulic cylinder-piston assemblies 31 and 32 as indicated in Figures 3 and 5, both cylinders being fixed to the support bracket 30 and the two pistons being connected to the clamp brackets 29 and 28, respectively. These cylinders are supplied through flexible hoses (not shown) with pressure fluid from a pump driven by the truck engine and controlled by the operator on the truck for translating the clamp brackets telescopically apart and together. The specific construction of the clamp brackets and their mounting on the elevator, as well as the actuating motor and control device thereof are all known and form no part of the invention; further description thereof is, therefore, unnecessary and the invention is not restricted to the specific arrangement illustrated.

Figure 12:
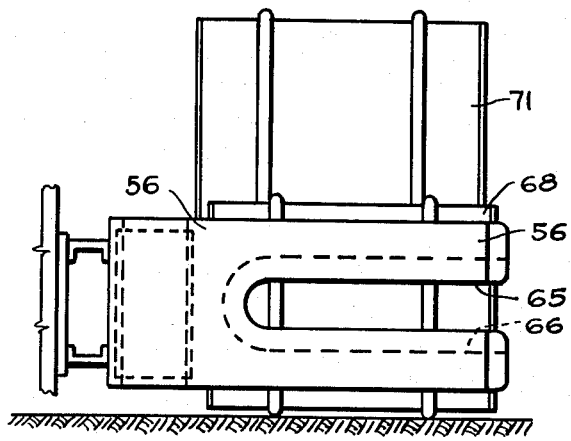
Figure 12 is a side elevation view of a clamp having a grab arm of modified construction, employed to clamp a plurality of drums.

Each clamp bracket carries a grab arm 33 or 34, rigidly secured to the lateral end of the bracket. Each grab arm is assembled from a plurality of parallel, verticle, pre-set spring leaves 35, 36 and 37 that are arranged as a transverse stack and are fixed at their rear ends to the clamp brackets in any suitable manner, e. g., secured by screws 38 recessed in countersunk holes. The leaves extend forwardly in generally parallel directions for progressively different distances, the inner leaf 35 extending the full length of the grab arm to provide a smooth, continuous inner surface to the arm and the leaves 36 and 37 extending forwardly for successively smaller distances, whereby the cross sectional area of the arm (as indicated in Figure 7) becomes smaller toward the front. The cross sectional area may be further reduced toward the front by tapering the arms, making the upper edge 39 thereof slope downwards toward the front; this taper is not, however, essential, and the outlines of the leaves may be generally rectangular, as shown in Figure 12. The vertical dimensions of the leaves, at least at the rear where they are connected to the clamp brackets, are sufficient to transmit vertical cantilever stress due to the weight of the clamped load without buckling despite the use of thin laminations, e. g., usually in excess of one-fourth of the length or even substantially equal to the length of the arm as shown in Figures 1 and 6.

The grab arms of this embodiment are both vertical, i. e., their intersections with a transverse, vertical plane are parallel. The leaves are pre-set to provide a toe-in or convergence at least at the front. Thus, in this embodiment, the rear parts of the arms are substantially parallel and the front parts only are curved gradually toward each other, as clearly shown in Figure 5. The location of the point at which the inward curvature begins will vary for different load dimensions and is usually spaced forwardly from the supported parts of the arms by a distance from one-eighth to one-half of the diameter of the primary, convexly-shaped load, such as a drum, to be clamped. Thus, in the case illustrated in Figures 1–9, wherein the clamp is intended to handle a single drum, the curvature begins at a point one-half drum diameter forward from the brackets 28 and 29; when two drums are to be clamped in side-by-side relation (with each drum engaging only one of the arms) curvature advantageously begins about one-fourth drum diameter forward; and when four drums, arranged in a rectangle, are to be clamped, the curvature advantageously begins one-eighth drum diameter forward. As will be shown later in connection with Figures 12–14, the arms need not be vertical and it is not essential that the intersections of the rear parts of the arms on a longitudinal horizontal plane be parallel; it is, however, desirable that the leaves be pre-set to converge at least the front parts and that this convergence be at least as great as that, if any, of the rear parts. The degree of convergence will depend upon the flexibility of the arm, a more flexible arm being adapted to a greater convergence. Convergence and flexibility are such that the arms can be deflected laterally outward to engage flat-ended objects having parallel ends all along the length of that part of the grab arm that is opposite the object by applying a reasonable clamping force which will not injure fragile objects. For example, when the arms are 4 ft. long, the front ends may be from one to five inches closer together than their rear ends. Too great a convergence is not desirable since it prevents insertion of the arms into narrow gaps.

The parts of the leaves forward of the clamp brackets are free to slide longitudinally with respect to each other at least for limited distances upon being flexed laterally outwardly when an article is clamped, and the leaves may optionally be secured against separation by suitable retaining means that permits such relative sliding. According to the embodiment of Figures 1–9 the leaves are secured by upper and lower U-shaped retaining clips 40 and 41, respectively. Each clip is fitted in a pair of longitudinally elongated niches 42 and 43 milled in the innermost and outermost leaves 35 and 37, respectively, to depths about equal to the thickness of the clip stock but less than the thickness of the leaves, whereby the exposed faces of the clips are substantially coplanar with the exposed faces of the niches' leaves, as shown clearly in Figure 9. These clips may be fixed to one of the leaves, e. g., the inner leaf 35, by set screws 44 which are countersunk in the clips and threaded into only the exposed leaf. The niches 43 are longer than the clips, as shown in Figure 8, to permit sliding between the leaf 37 and the clip. The bottom edges of all three leaves are preferably notched under the lower clips 41, as indicated at 43a, to recess the clip, thereby avoiding protrusion of the clip beneath the lower edge 45 of the grab arm.

According to an alternate embodiment, shown in Figures 10 and 11, the leaves are connected together by a bolt 46 having the head thereof recessed in a countersunk hole in the inner leaf 35 and extending through longitudinal slots in the other leaves of the arm. A nut 47, securely fixed to the bolt, as by welding, is slidable within a longitudinal niche 48 milled into the exposed face of the outer leaf 37 to a depth less than the leaf thickness. It will be seen that the head and nut are both flush with the exposed faces of their respectively contiguous leaves and that the leaves are free to slide with respect to each other.

Still another arrangement for retaining the leaves, applicable here, will be described with reference to Figures 12–14.

Referring again to Figures 1, 6 and 7, a horizontal slot 49, open to the front, is provided in each arm for a suitable distance back from the front of the arm in accordance with the intended use of the clamp, e. g., slightly in excess of half of the length of the arm as shown in these views, or slightly in excess of the three-quarter point, as shown in Figure 12. This slot serves the dual purpose of (1) facilitating insertion of the grab arm into a gap between a wall and a stack of drums or between stacks of drums that have no clearance between rolling hoops or withdrawal of the arms from such gaps, and (2) providing added security in supporting the load in that the rolling hoops or convexly curved parts or other protuberances on the clamped object can project outwardly into the slot to receive vertical support. The height of the slot 49 should not, however, be made greater than necessary to achieve these purposes because the flexible grab arms according to the invention are made thin and should be of sufficient vertical extent to perform their function without buckling or permanent deformation. In general, it is preferred that, at about the midpoint of the slot, the height of the slot, be only a minor part of the height of the grab arm, advantageously not greater than the height of either the part of the arm above the slot or the part below the slot.

The exposed faces of the inner leaves 35 of the grab arms, and optionally, the front face of the support bracket 30, are preferably covered with a suitable resilient material 50 having a high co-efficient of friction, such as rubber facing, expanded metal, mesh, or a combination of these or similar materials.

It is evident that the forward parts of the grab arms are more readily flexed laterally than the rear parts because the cross sectional area of the arms is smaller at the front. This compensates for the effect of a force applied horizontally to the front of the arms, which causes a relatively greater bending moment near the rear than near the front. This increased flexibility and the convergence together make it possible to clamp flat-sided objects such as light cartons without danger of crushing them, while at the same time providing, toward the rear portions of the arm, sufficient stiffness to permit the application of greater clamping stresses both on flat-sided objects and on convexly curved objects such as upright cylindrical drums without danger of loss of the latter by "popping out" at the front.

When using the lift truck for handling objects with flat ends, such as a carton or box 51 (Figures 1 and 2) the clamp brackets are moved apart and the truck is maneuvered into position to embrace the box. When the clamp is closed by moving the clamp brackets together the box is engaged first at the front parts of the grab arms. These parts, being most flexible, become straightened elastically, thereby engaging the ends of the box resiliently along the lengths of the arms, and affording a dependable clamping action despite outward bending deflection of the rear parts of the arms where the bending moment is greatest. The arms, accordingly, assume the shapes shown in Figure 2 and a substantially even pressure is applied against the box. When such outward bending of the rear parts occurs the resiliency of the front parts maintains the latter in continuous contact with the ends of box. Moreover, the flexibility also permits the arms to adapt themselves to boxes the ends of which are not truly parallel and makes it possible to clamp securely a plurality of boxes situated not only across the breadth of the clamp but also at various points along the lengths of the arms. Further, the high degree of flexibility afforded by the forward ends of the arms makes it easy for the operator to stop the closing of the clamp brackets after application of only part of the available clamping force. This is of importance, particularly when handling boxes of light construction, such as cartons made of paperboard.

When the clamp is used for lifting objects with rounded outlines, such as oil drum 52 standing on end (Figure 4) that has rolling hoops 53, the clamp is similarly opened and the truck maneuvered to embrace the drum, the elevator being previously moved if necessary to position the slot 49 at the level of one of the rolling hoops. The lengths of the arms shown in this embodiment are such that only a single drum of the size indicated can engage each arm, although either one or two drums can be placed across the width of the clamp, only the former case being illustrated in Figure 4. With arms of such length the widest parts of the drum or drums will engage the arms approximately at the midpoints of the arms where the convergence begins. When the clamp brackets are brought together, the rolling hoop or hoops opposite the slot 49—the lower hoop in this case—projects through the said slot and the other rolling hoop extends laterally outwards from the grab arms over the upper or lower edges—the upper edges in the case illustrated. Each of the parts of the grab arms above and below the slot applies clamping force to the drum at smooth, cylindrical portions thereof. The forward parts of the arms remain toed-in and the drum is secured against forward slippage despite deflection of the rear parts of the arms due to the application of a strong clamping force by the clamp brackets or the sudden stopping of the truck 20 when in forward motion. In fact, the clamp can securely clamp two upright drums disposed side by side, with one drum in engagement with only the arm 33 and the other drum in engagement with only the arm 34. The convergence of the flexible front parts of the arms again prevents forward slippage. With longer arms a greater number of upright drums, arranged in two rows parallel to the arms, can be clamped. The clamp is not, of course, restricted to handling drums in upright positions; they may be on the side with the parallel ends in engagement with the grab arms (in which case the drum is to be regarded as a flat-ended object) or with the drum axis parallel to the clamp axis, as will be illustrated in connection with Figures 12–14.

An important advantage of the construction is that it permits the grab arms to be made relatively thin and with outer and inner surfaces, that are free from protuberances, whereby the arms can be inserted into narrow gaps or withdrawn therefrom.

Figure 13:
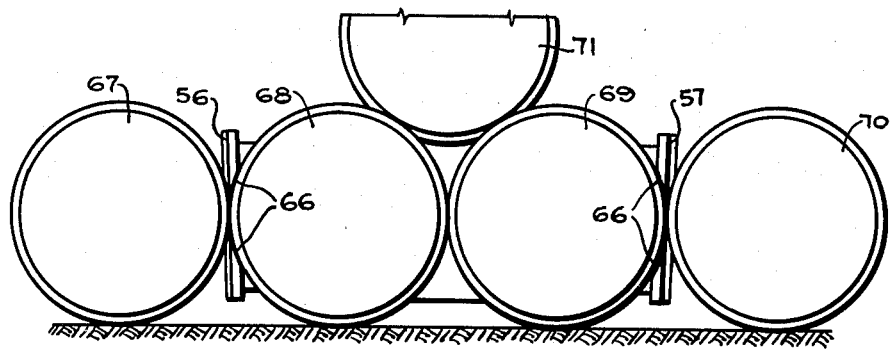
Figure 13 is a front elevation view of the device shown in Figure 12.
Figure 14:
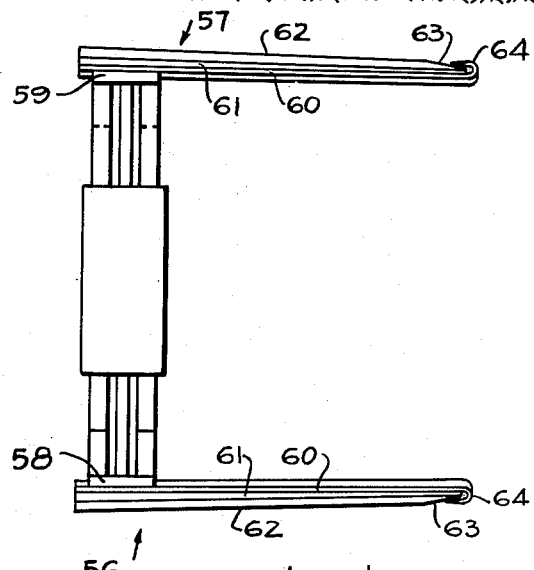
Figure 14 is a plan view of the clamp according to Figure 12, the drums being omitted to show the unstressed shape of the arms.

Several variants that may be employed individually or in combination are illustrated in the embodiment according to Figures 12–14; among these are the use of camber in conjunction with toe-in, arms that are continuously convergent from points near the support brackets, the use of horizontally tapered leaves, a modified arrangement for retaining the leaves of the arms against separation, a rectangular outline for the arms, and a slot that is deeper and has beveled edges. This embodiment is particularly adapted to handling drums with their axes parallel to the clamp axis as shown in Figures 12 and 13 in view of the camber and the beveled, elongated slots; however, drums can also be clamped in this position with the previous embodiments while the instant embodiment is capable of all of the uses described above.

Referring to Figures 12–14 in detail, the clamp comprises a pair of grab arms 56 and 57, rigidly secured to laterally translatable clamp brackets 58 and 59, respectively, which may be constructed and mounted similarly to the brackets 28 and 29, except that the sides thereof are not parallel but converge toward the bottom and toward the front, best seen in Figures 13 and 14, respectively. The former imposes a camber to the grab arms, whereby the intersections of the arms with a transverse vertical plane are downwardly convergent. Both of these convergences are made small, particularly when the clamp is to be used also for handling objects with flat, parallel ends; convergences of from about 1° to 6° are normal.

Each grab arm is built up of three contiguous leaf spring laminations 60, 61 and 62, all rigidly secured to the respective clamp bracket at their rear ends. The arms are pre-set by virtue of the convergence of the sides of the brackets to converge at a constant convergence substantially from the clamp brackets to their front ends, whereby the composite arms can be flat and merely bolted to the brackets. The parts of these leaves forward of the clamp brackets are free for relative longitudinal sliding, such as would occur upon deflection of the arms when they are clamped to an object. The separation of the leaves is in this embodiment prevented by beveling the exposed edge of one of the leaves, e. g., the outer leaf 62 to provide a vertical bevel 63 and by both beveling and bending the edge 64 of the other exposed leaf 60 over the bevel 63. All three leaves are shown to extend for the full length of the arms and the outline of the arms, seen in Figure 12, is generally rectangular; however, the arms are again made more flexible at their front ends by reducing the thickness of the arms toward the front. This is effected, for example, by tapering two outer leaves 61 and 62 toward the front, as shown; moreover, the intermediate leaf 61 need not extend all the way to the front of the arm.

A longitudinal slot 65 is cut from the front through all of the several leaves. (The slot is omitted from Figure 14 for clarity.) This slot corresponds to and serves the functions previously described for the slot 49 but is here made longer to extend for slightly more than three-fourths of the length of the arm; this permits two upright drums to engage the same arm and have one rolling hoop of each project through the slot. The vertical extent of the slot must again be kept within bounds, as noted above, so as not to weaken the arms, and a relatively thin slot as shown is preferred, particularly when the arm is made long. The edges of the slot 65 may be beveled, as shown at 66, to conform approximately to the outline of a drum or keg, thereby better adapting the clamp to picking up such objects when their axis is parallel to the clamp axis without damage to the object. The grab arms may, if desired, be covered with resilient material (not shown) having a high co-efficient of friction, as previously described.

The clamp may be used, for example, as shown in Figures 12 and 13, wherein 67–70 are four touching drums resting on the ground and 71 is a drum resting on drums 68 and 69. To pick up the center three drums the lift truck is maneuvered to a location opposite the ends of these drums with grab arms opposite the appropriate intervals, the elevator being operated to bring the slots 65 to the level of the points of contact between the drums 67 and 68, and between the drums 69 and 70. The clamp is then inserted into the gaps between the drums and above and below the points of contact. When the clamp is closed the drums 68 and 69 are clamped together, the forward ends of the arms becoming flexed outwardly until they are both perpendicular to a transverse vertical plane, or nearly so, i. e., they lose all or most of their convergence. They may also lose some or most of the camber. The rolling hoops project outward through the slots 65. These slots and the camber jointly contribute to the stability of the clamping action.

It is evident that changes in the details and dimensions may be made without departing from the spirit of the invention as defined in the appended claims.

An example of a clamp with grab arms formed of single plates is disclosed in co-pending application Serial No. 328,303, filed concurrently herewith, wherein the feature of providing camber (shown in Figures 12–14) is claimed.

I claim as my invention:

1. In a clamp adapted to handle flat ended objects and convexly curved objects the combination of—a support structure, a pair of clamp brackets on said support structure mounted for lateral movement toward each other, means for moving said brackets relative to each other, a pair of thin substantially vertical grab arms extending longitudinally forwardly from said clamp brackets, each of said grab arms being rigidly attached to one of said clamp brackets, the front of each said grab arm being converged toward the other grab arm and each grab arm comprising a plurality of parallel spring leaves including an inner leaf facing the other grab arm and an outer leaf, the front parts of said leaves being free to slide longitudinally relative to one another when the grab arm is deflected outwardly.

2. A combination according to claim 1 wherein the thickness of each grab arm is less at the front than at the rear whereby the grab arm has relatively greater lateral flexibility at the front than at the rear.

3. A combination according to claim 2 wherein said grab arms are spaced apart a substantially constant distance at the rear parts thereof and the front parts of said grab arms are curved gradually toward each other.

4. A combination according to claim 1 wherein said grab arms have longitudinal slots open to the front for receiving laterally protruding parts of objects to be clamped, said slots extending backwards at least about half the lengths of the grab arms.

5. In a clamp adapted to handle flat ended objects and convexly curved objects the combination of—a support structure, a pair of clamp brackets mounted on said support structure for relative lateral movement, means for moving said brackets relative to each other and a pair of thin vertical grab arms extending longitudinally forwardly from said clamp brackets, each of said grab arms being rigidly attached to one of said clamp brackets, the front part of each grab arm having a greater lateral flexibility than the rearwardly part thereof and each grab arm comprising a plurality of spring leaves, the front part of said spring leaves being free to move relative to one another when the arm is deflected outwardly.

6. A combination according to claim 5 wherein said grab arms have longitudinal slots open to the front for receiving laterally protruding parts of objects to be clamped.

7. A combination according to claim 2 wherein said grab arms converge continuously substantially from the clamp brackets to their front ends.

No references cited.